(12) United States Patent
Yin et al.

(10) Patent No.: US 11,995,889 B2
(45) Date of Patent: May 28, 2024

(54) COGNITIVE GENERATION OF HTML PAGES BASED ON VIDEO CONTENT

(71) Applicant: International Business Machines Corporation, Armonk, NY (US)

(72) Inventors: Kun Yan Yin, Ningbo (CN); Xiao Bo Li, Ningbo (CN); Sheng Hui Zhan, Ningbo (CN); Qi Wang, Ningbo (CN); Shu Zhang, Ningbo (CN); Yujia Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 17/233,741

(22) Filed: Apr. 19, 2021

(65) Prior Publication Data

US 2022/0335243 A1    Oct. 20, 2022

(51) Int. Cl.
| | |
|---|---|
| *G06V 20/40* | (2022.01) |
| *G06F 16/78* | (2019.01) |
| *G06F 16/783* | (2019.01) |
| *G06F 40/154* | (2020.01) |
| *G06N 20/00* | (2019.01) |
| *G06T 7/11* | (2017.01) |

(Continued)

(52) U.S. Cl.
CPC ............ *G06V 20/46* (2022.01); *G06F 16/785* (2019.01); *G06F 16/7867* (2019.01); *G06F 40/154* (2020.01); *G06N 20/00* (2019.01); *G06T 7/11* (2017.01); *G06V 10/44* (2022.01); *G06V 10/50* (2022.01); *G06V 10/56* (2022.01)

(58) Field of Classification Search
CPC ........ G06V 20/46; G06V 10/44; G06V 10/50; G06V 10/56; G06F 16/785; G06F 16/7867; G06F 40/154; G06N 20/00; G06T 7/11
See application file for complete search history.

(56) References Cited

U.S. PATENT DOCUMENTS

| | | |
|---|---|---|
| 9,860,334 B2 | 1/2018 | Kuperman |
| 10,262,072 B2 | 4/2019 | Dewa |

(Continued)

FOREIGN PATENT DOCUMENTS

WO    WO-2007029204 A2 *    3/2007    ....... G06F 17/30867

OTHER PUBLICATIONS

Beaver Builder. (Jul. 2020). Slideshow. https://docs.wpbeaverbuilder.com/beaver-builder/layouts/modules/slideshow/. (Year: 2020).*

(Continued)

*Primary Examiner* — Amandeep Saini
*Assistant Examiner* — Daniella M. DiGuglielmo
(74) *Attorney, Agent, or Firm* — Kristofer Haggerty

(57) ABSTRACT

Methods, computer program products, and/or systems are provided that perform the following operations: obtaining video data; dividing the video data into a plurality of video fragments based, at least in part, on page detection; extracting one or more elements from each of the plurality of video fragments; determining element type data for each of the one or more extracted elements; generating element style data for the one or more extracted elements; determining page flow for the plurality of video fragments; and generating one or more pages based, at least in part, on the one or more elements extracted from the plurality of video fragments, the element type data, the element style data, and the page flow.

17 Claims, 12 Drawing Sheets

(51) Int. Cl.
 *G06V 10/44* (2022.01)
 *G06V 10/50* (2022.01)
 *G06V 10/56* (2022.01)

(56) References Cited

U.S. PATENT DOCUMENTS

| | | |
|---|---|---|
| 10,460,766 B1 | 10/2019 | Sangoli |
| 2007/0250769 A1* | 10/2007 | Bass ..................... G06F 40/174 715/234 |
| 2008/0310731 A1* | 12/2008 | Stojancic ............... G06V 20/40 382/195 |
| 2013/0204867 A1* | 8/2013 | Lim ..................... G06F 40/258 707/723 |
| 2015/0262007 A1* | 9/2015 | Sesum ................. G06V 30/414 382/177 |
| 2016/0014482 A1* | 1/2016 | Chen .................. H04N 21/8456 386/241 |
| 2017/0339450 A1* | 11/2017 | Cowburn ......... H04N 21/23412 |
| 2019/0310835 A1* | 10/2019 | Gong ........................ G06F 8/41 |
| 2019/0355393 A1* | 11/2019 | Pankaj ................... G11B 27/34 |
| 2020/0118597 A1* | 4/2020 | Sangoli ................. G06F 16/748 |
| 2021/0049349 A1* | 2/2021 | Farokhi .................. G06V 20/10 |
| 2021/0248420 A1* | 8/2021 | Zhong .................... G06V 10/82 |

OTHER PUBLICATIONS

Eddins, Steve, "im2html.m", MATLAB Central File Exchange, Retrieved Sep. 3, 2020, 4 pages, <https://www.mathworks.com/matlabcentral/fileexchange/32273-im2html-m>.

Monmarche et al., "Imagine: a tool for generating HTML style sheets with an interactive genetic algorithm based on genes frequencies", IEEE SMC'99 Conference Proceedings, 1999 IEEE International Conference on Systems, Man, and Cybernetics (Cat. No. 99CH37028), 6 pages.

Sabovcik, František, "Graphical Design Tool for HTML5 Applications", Brno University of Technology, Bachelor's Thesis, May 19, 2015, English Abstract, 54 pages.

* cited by examiner

COGNITIVE GENERATION OF HTML PAGES BASED ON VIDEO CONTENT

BACKGROUND

The present invention relates generally to the field of content management, and more particularly to the generation of HTML pages based on video content.

SUMMARY

According to an aspect of the present invention, there is a method, computer program product and/or system that performs the following operations (not necessarily in the following order): obtaining video data; dividing the video data into a plurality of video fragments based, at least in part, on page detection; extracting one or more elements from each of the plurality of video fragments; determining element type data for each of one or more extracted elements; generating element style data for the one or more extracted elements; determining page flow for the plurality of video fragments; and generating one or more pages based, at least in part, on the one or more elements extracted from the plurality of video fragments, the element type data, the element style data, and the page flow.

DETAILED DESCRIPTION

Figure 1:
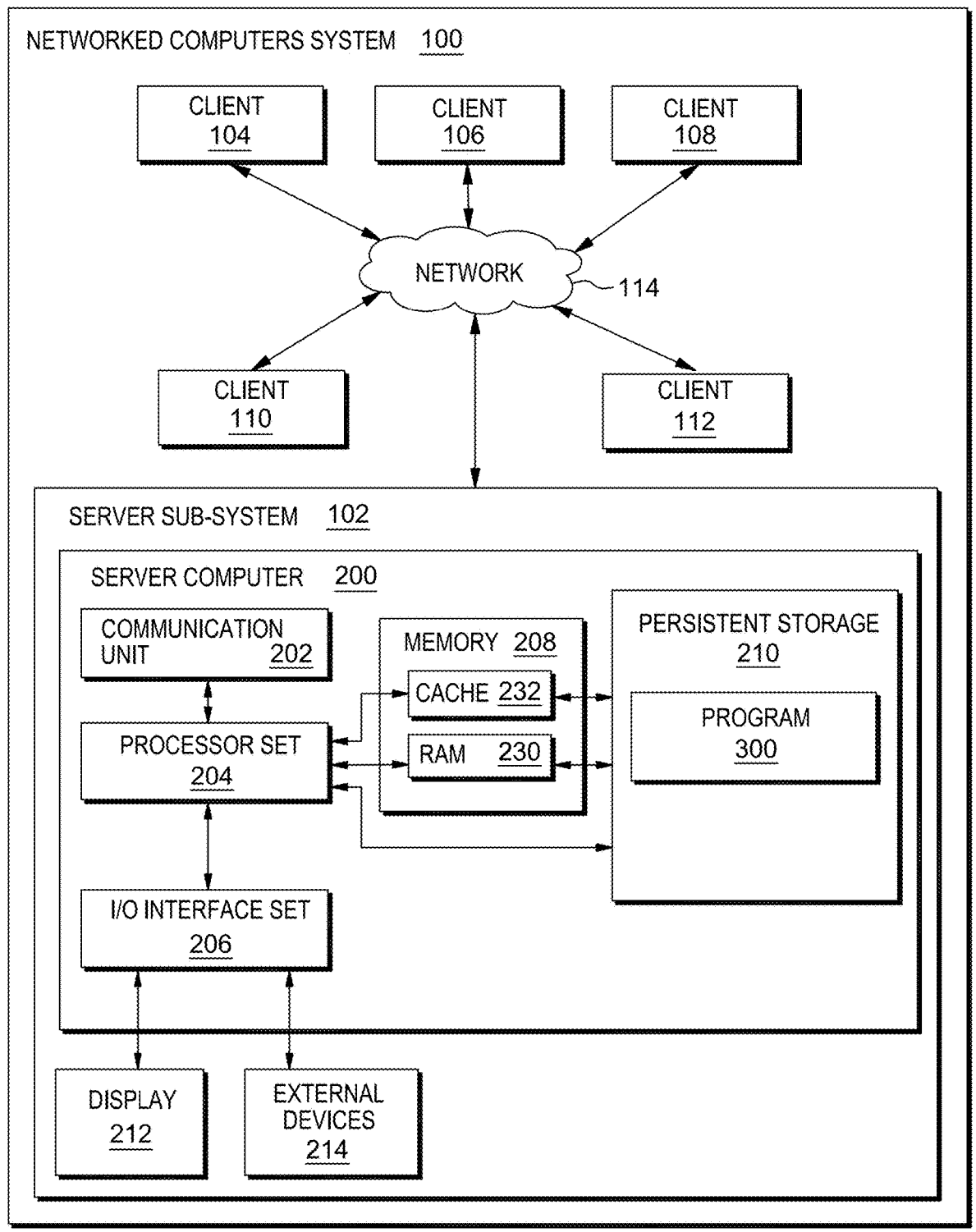
FIG. 1 depicts a block diagram view of a first embodiment of a system, according to the present invention.

According to aspects of the present disclosure, systems and methods can be provided to generate markup language pages, such as Hypertext Markup Language (HTML) pages and/or other markup language pages based on video content. In particular, systems and methods of the present disclosure can provide for detecting a plurality of pages associated with a video (e.g., video content, etc.) and extracting one or more elements associated with each page. The systems and methods of the present disclosure can provide for determining element types associated with the extracted elements, generating style data associated with the extracted elements, and determining a page path (e.g., page flow, etc.) for the plurality of pages. The systems and methods of the present disclosure can provide for generating HTML pages and/or other markup language pages based on the detected pages, the extracted elements, the element types, the style data, and the page path.

On occasion, it may be desirable to record and/or otherwise retain some video-type content that is being viewed/presented to user(s), such as websites, dynamic images/text, and/or other types of video content, such that it can be presented/viewed at another time. For example, a user may want to record/capture some content (e.g., video, dynamic content, etc.) that is being presented such that the content can subsequently be rendered/presented by some type of user-interface, such as a web browser and/or the like.

However, it may often be the case that recording, converting, and/or integrating video content and/or the like such that it can be stored (e.g., using a markup language, etc.) and subsequently rendered, for example, by a web browser, other user interface (UI) application, and/or the like, can be complex and can present a variety of other issues. As an example, in some cases, there may be such a large amount of content (e.g., many images, objects, visual components, etc.) that conversion of the content may become increasingly complex and/or time-consuming. As another example, if the content (e.g., video content, website content, etc.) includes different pages, the relationship(s) between the pages may need to be determined to convert and/or present the content effectively. Further, it may be necessary to determine which element or elements should be included on a page, determine what style should be used for each element or type of element, and/or the like when recording, converting, and/or integrating the content.

Accordingly, systems and methods of the present disclosure can provide for cognitive generation of user interface (UI) pages (e.g., HTML pages, other markup language pages, etc.) based on video content. Embodiments of the present disclosure can provide for detecting/determining pages included in or associated with the video content, extracting page elements, recognizing/determining element types, generating element styles, and determining/recognizing page path(s) to allow for generating UI pages (e.g., HTML pages, etc.) from video content.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can generate pages, such as HTML pages and/or the like, based on video content, detect pages included in or associated with the video content, extract page elements, recognize element types, generate element styles, determine/ recognize page path(s), and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
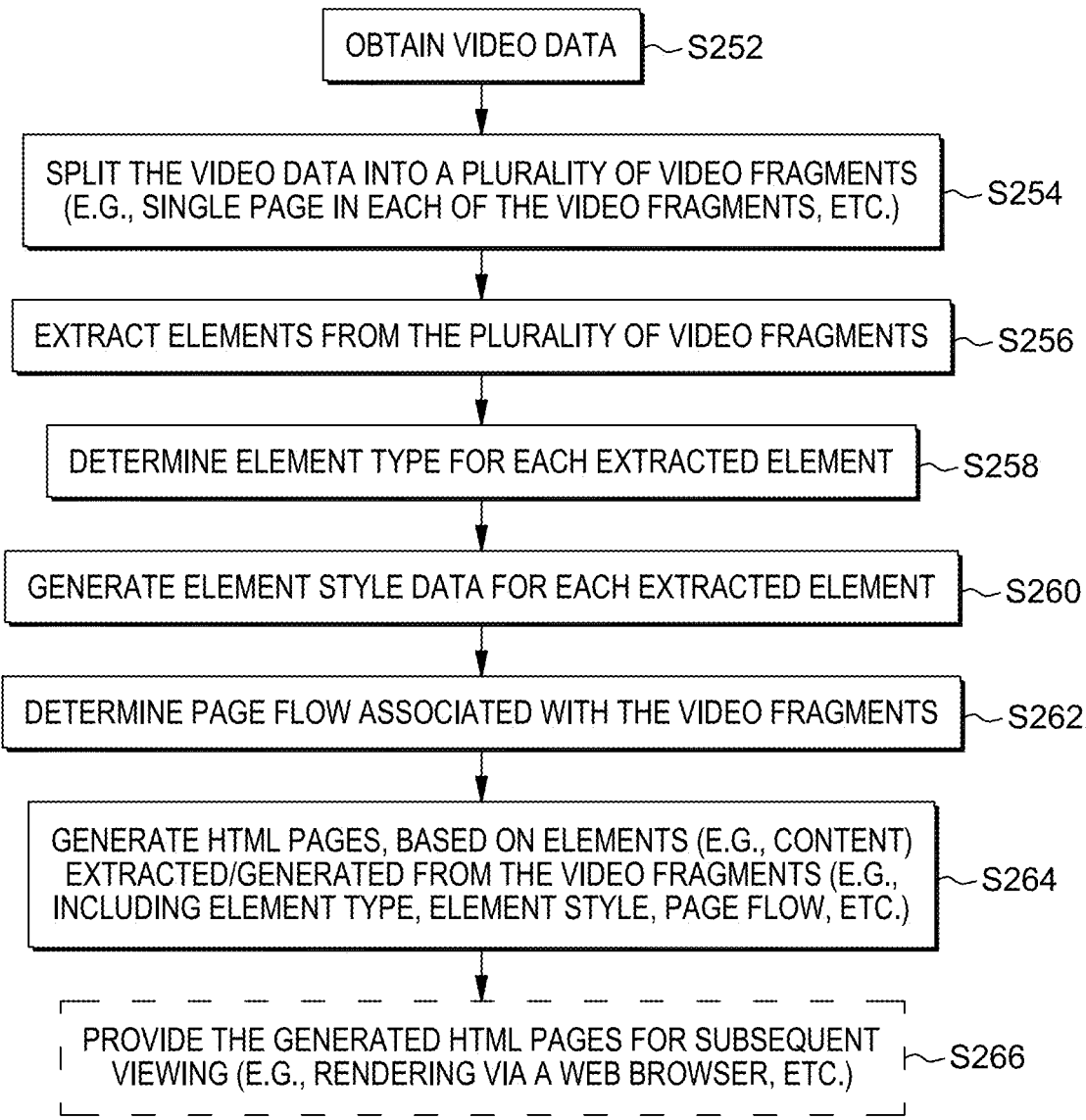
FIG. 2 depicts a flowchart showing a first embodiment method performed, at least in part, by the first embodiment system.
Figure 3:
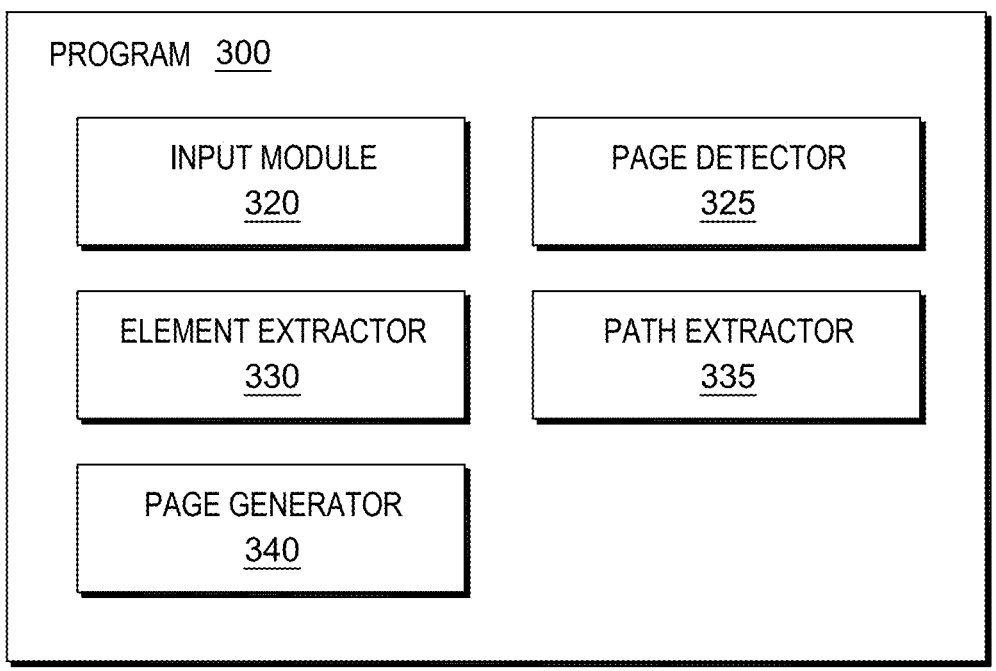
FIG. 3 depicts a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250. Regarding FIG. 2, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for generating HTML pages (or other markup language pages) based on video content begin at operation S252, where a computing system (e.g., server computer 200 of FIG. 1 or the like) obtains video data. For example, in some embodiments, video data (e.g., video stream, video content, website content, etc.) that is to be converted to HTML pages (or other markup language pages), can be obtained by the computing system. As an example, in some embodiments, a user, developer, and/or the like may determine that it would be desirable to convert video (e.g., video content, website content, presentation, poster, etc.) that is being viewed to HTML pages and/or other markup language pages. The generated HTML pages and/or other markup language pages can allow for the video content to be recorded, stored, and/or rendered for viewing at a later time (e.g., stored/viewed at a local/remote computing device, provided for website page(s), rendered by a web browser, etc.).

As an example, an input module 320 of FIG. 3 and/or the like can provide for obtaining video data (e.g., content, etc.) such that a plurality of HTML pages (or other markup language pages) can be generated based on the video content. In some embodiments, the input module 320 and/or the like can provide for receiving an indication (e.g., from a user, etc.) that certain video content (e.g., video stream, website presentation, etc.) should be obtained for use in generating HTML pages and/or the like based on the video content. The input module 320 and/or the like can provide for obtaining viewed video and/or associated data and providing it for the generation of HTML pages and/or other markup language pages.

Processing proceeds to operation S254, where the computing system (e.g., server computer 200 of FIG. 1 or the like) divides the video data into a plurality of video fragments based, at least in part, on page detection. In some embodiments, the video data can be split into video fragments such that there is a single page (e.g., to be generated) in each of the video fragments. As an example, a page detector 325 and/or the like can provide for splitting the video data into a plurality of video fragments (e.g., pages). In some embodiments, the page detector 325 and/or the like can provide for using color information and/or edge information to split the input video into a plurality of video fragments, with a single page in each of the video fragments. For example, different application screens/pages, web pages, video segments, and/or the like can have different frameworks and/or different colors. As such, edge information and color information in video data (e.g., video content, etc.) can provide clues to distinguish and/or detect different pages in the video data (e.g., video content, etc.).

For example, in some embodiments, the computing system can split the video data into frames (e.g., video frames, etc.) and extract color information and edge information for each frame. In some embodiments, the video can be split into frames using Open Source Computer Vision Library (OpenCV) and/or the like. In some embodiments, the color information can be extracted based on color histograms associated with each frame. In some embodiments, the edge information can be extracted based on an edge detector and/or edge detection algorithm, such as Canny edge detection, for example. The computing system can compute a color difference (e.g., color histogram difference, etc.) and an edge difference for neighbor frames. The computing system can fuse the color difference and edge difference for each set of neighboring frames and use the fused differences to group frames to create segments of video frames, for example, based on a difference threshold and/or the like. Each segment can include one or more frames. The computing system can determine and/or extract one of the frames in each segment as a key frame for the segment. In some embodiments, a frame at or near the middle of a segment can be selected as the key frame for the segment. The computing system can provide the key frames as the video fragments (e.g., detected pages, etc.) to be used in generating the HTML pages and/or other markup language pages based on the video content.

Processing proceeds to operation S256, where the computing system (e.g., server computer 200 of FIG. 1 or the like) extracts one or more elements from each of the plurality of video fragments. As an example, an element extractor 330 of FIG. 3 and/or the like may obtain the plurality of video fragments (e.g., detected pages, etc.) and process each video fragment to extract elements that can be used in generating HTML pages and/or other markup language pages based on the video content.

In some embodiments, as an example, the computing system can obtain the plurality of video fragments and use edge detection to determine elements included in each video fragment that can be extracted to generate HTML pages and/or the like. For example, in some embodiments, the computing system can used edge detection to generate an edge graph and/or the like for each video fragment and the edge graphs can be used in identifying and/or extracting elements for each video fragment. In some embodiments, Canny edge detection can be used for edge detection.

In some embodiments, the computing system can provide for building an object tree (e.g., for each video fragment/page, etc.) based on edge detection data (e.g., edge graph, etc.) and/or extracted element data for each video fragment. The object trees can be abstracted from the video fragments and allow for the locating of each element of a video fragment (e.g., page, etc.), for example, using a path from the root of the tree to a specified node (e.g., associated with the element to be located on a page, etc.). As an example, in some embodiments, the computing system can build an object tree by identifying the video fragment (e.g., page, etc.) as the root node of the object tree associated with the video fragment (e.g., page, etc.) and adding nodes to the tree for each extracted element associated with the video fragment (e.g., page, etc.) based on relationships between the elements. In some embodiments, nodes can be added by following a top-to-bottom and left-to-right progression.

Processing proceeds to operation S258, where the computing system (e.g., server computer 200 of FIG. 1 or the like) determines element type data for each of the one or more extracted elements. For example, in some embodiments, element types (e.g., element type data, etc.) can include button, dropdown, input (e.g., input box, input field, etc.), image, text block, table, and/or the like. As an example, an element extractor 330 of FIG. 3 and/or the like may determine an element type for each extracted element.

In some embodiments, for example, the computing system (e.g., element extractor 330, etc.) can provide for determining an element type (e.g., element type data, etc.) for an extracted element using similarity recognition, for example, by searching a corpus, such as a design element library and/or the like, for a similar element and defining the element type associated with an identified similar element in the library as the element type for the extracted element. In some embodiments, the computing system (e.g., element extractor 330, etc.) can provide for determining an element type (e.g., element type data, etc.) for an extracted element using one or more machine learning models, such as a classification model and/or the like.

Processing proceeds to operation S260, where the computing system (e.g., server computer 200 of FIG. 1 or the like) generates element style data for the one or more extracted elements. For example, the computing system can determine and/or generate element style data that can be used in defining the presentation of elements and/or the rendering of elements for generated HTML pages and/or other markup language pages. In some embodiments, the element style data can include one or more of size data, position data, alignment data, color background data, font data, and/or the like. In some embodiments, the element style data can be provided using cascading style sheets (CSS) and/or the like. As an example, an element extractor 330 of FIG. 3 and/or the like may determine and/or generate element style data including size data, position data, alignment data, color background data, font data, and/or the like for the extracted elements. In some embodiments, the element extractor 330 and/or the like can provide the element style data for use in rendering HTML pages and/or other markup language pages based on the video content.

Processing proceeds to operation S262, where the computing system (e.g., server computer 200 of FIG. 1 or the like) determines page flow (e.g., page path, etc.) for the plurality of video fragments. As an example, a path extractor 335 and/or the like can identify and/or determine a page path associated with the plurality of video fragments (e.g., pages, etc.) representative of the flow and/or navigation sequence of the pages detected in the video content. In some embodiments, the computing system can determine the page flow (e.g., page path, etc.) for the plurality of video fragments based on a default path recognition. For example, the page flow (e.g., page path, etc.) for the plurality of video fragments can indicate an order in which the pages generated from the video fragments should be presented. In some embodiments, the computing system can determine a default page flow (e.g., page path, etc.) based on a parameter associated with the detected pages, such as a segmented page frame number associated with each detected page.

In some embodiments, the computing system can provide for recognizing and/or determining an action associated with a page and/or element. The computing system can provide for refining and/or modifying the page path (e.g., default page path, etc.) based on the action recognition. For example, in some embodiments, the computing system may provide for recognizing an action associated with a video fragment (e.g., pages etc.) that may affect page flow (e.g., page path, etc.), such as by altering some portion of an expected default page path and/or the like. As an example, the computing system may identify an action associated with an element and/or page, such as a button click and/or the like, that may alter navigation between pages, for example, causing a jump from one page to another page that would differ from a default page path.

Processing proceeds to operation S264, where the computing system (e.g., server computer 200 of FIG. 1 or the like) generates one or more markup language pages (e.g., HTML pages, etc.). The computing system can provide for generating the HTML pages and/or other markup language pages based, at least in part, on the one or more elements extracted from the plurality of video fragments, the element type data, the element style data, and the page flow. As an example, a page generator 340 and/or the like can obtain data associated with the detected pages, the extracted elements, the element type data, the element style data (e.g., CSS, etc.), the page flow data (e.g., page path, etc.), and/or the like. The page generator 340 and/or the like can generate HTML pages and/or other markup language pages, based on video content, using the extracted elements, element type data, element style data (e.g., CSS, etc.), page flow data (e.g., page path, etc.), and/or the like.

Optionally, in some embodiments, processing may proceed to operation S266, where the computing system (e.g., server computer 200 of FIG. 1 or the like) can provide the generated markup language pages (e.g., HTML pages, etc.) to be stored and/or rendered for subsequent viewing.

Further Comments and/or Embodiments

Figure 4:
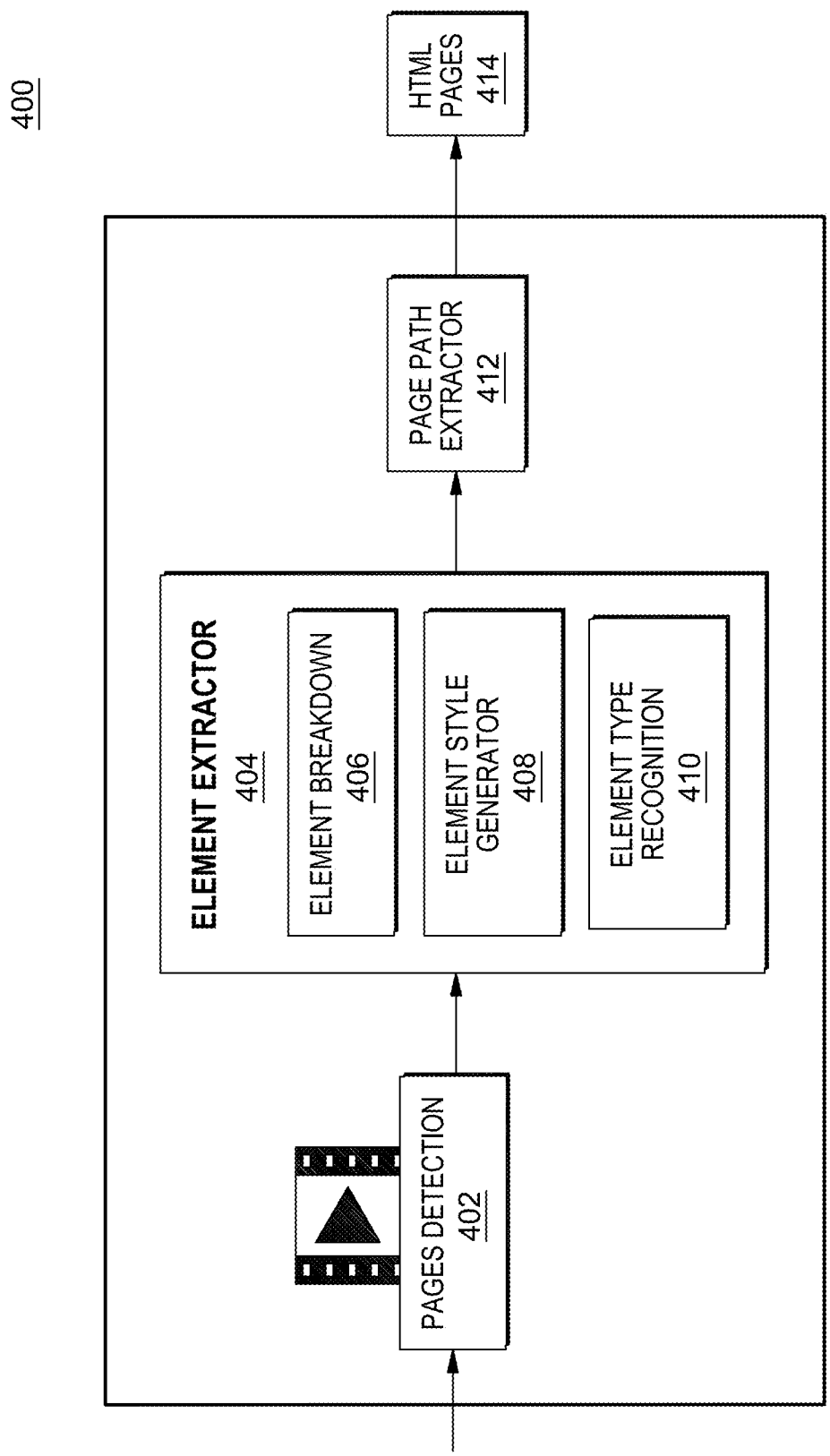
FIG. 4 depicts a block diagram of an example workflow for cognitive generation of HTML pages based on video content, according to embodiments of the present invention.

FIG. 4 depicts a block diagram of example workflow 400 and/or modules for generation of HTML pages (or other markup language pages) based on video content, according to embodiments of the present invention. As illustrated in FIG. 4, a computing system (e.g., server computer 200 of FIG. 1 or the like) can provide for the generation of a plurality of HTML pages and/or the like based on video content (e.g., through program 300 and/or the like), such as depicted by workflow 400. A workflow 400 for HTML page generation can include modules/operations such as page detection module 402, element extractor 404, page path extractor 412, and/or the like.

In some embodiments, video (e.g., video data, video stream, video content, website content, etc.) can be obtained by page detection module 402. Page detection module 402 can provide for dividing/splitting the video into video fragments, where each video fragment can represent a single page (e.g., include content for a single HTML page that is to be generated, etc.). Page detection module 402 can provide the video fragments (e.g., pages, key video frames, etc.) to an element extractor 404 which can provide for obtaining and/or determining video content (e.g., elements, features, components, etc.) and associated data included in each page. The obtained content (e.g., elements, etc.) and associated data can be used in converting the video to HTML pages, other markup language pages, and/or the like (e.g., generating and providing HTML pages, etc. based on the video content).

In some embodiments, the element extractor 404 can include element breakdown module 406, element style generator 408, element type recognition module 410, and/or the like. the element extractor 404 can provide for extracting elements (e.g., features, components, content, etc.) and associated data the different pages (e.g., determined by the page detection module 402, etc.) and used in generating pages, for example, HTML pages, other markup language pages, and/or the like, that can be stored and/or subsequently provided/viewed. The video fragments can be obtained by the element extractor 404, for example, by element breakdown module 406 of element extractor 404. Element breakdown module 406 can provide for extracting elements from each video fragment, for example, elements that can be used in generating HTML pages and/or the like from the video. Data associated with the extracted elements can be provided to element style generator 408, element type recognition module 410, and/or the like.

Element style generator 408 can determine and/or generate style data that can be used in the rendering of elements for generated HTML pages. As an example, in some embodiments, the style data can include one or more of size data, position data, alignment data, color background data, font data, and/or the like that may be associated with and/or representative of extracted elements. In some embodiments, the element style generator 408 can generate cascading style sheets (CSS) which can include and/or describe style data (e.g., presentation, format, etc.) for extracted elements, and which can be used in generating HTML pages and/or other markup language pages.

Element type recognition module 410 can recognize and/or determine element types (e.g., element type data, etc.) associated with each extracted element. The element type data for the extracted elements can be provided, for example, for use in generating HTML pages (e.g., providing appropriate elements in a page, etc.). For example, in some embodiments, element types (e.g., element type data, etc.) can include button, dropdown, input (e.g., input box, field, etc.), image, text block, table, and/or the like. In some embodiments, an element type recognition module 410 may provide for comparing extracted elements to a corpus of popular elements (e.g., a popular design element library, etc.) to assist in determining element types (e.g., similarity recognition). In some embodiments, an element type recognition module 410 may analyze/review action(s) taken and/or page response(s) associated with an element to use in determining a page type. In some embodiments, an element type recognition module 410 may provide for accessing/using classification model(s) to assist in determining element types (e.g., model-based recognition).

The page path extractor 412 can obtain data associated with the video fragments, for example, data generated by page detection module 402, element extractor 404, and/or the like. The page path extractor 412 can provide for identifying a page path associated with the video content (e.g., video fragments, etc.) to be used in generating page path/flow for HTML pages to be generated/converted from the video content. For example, in some embodiments, page path extractor 412 can identify/determine a page path/flow based on segmented frame numbers identified/associated with video content (e.g., segmented frame numbers identified during page detection, etc.). In some embodiments, page path extractor 412 can recognize/determine page response(s) to user actions or the like to extract/determine a page path/flow (e.g., dynamic page flow etc.). As an example, page path extractor 412 can provide for action recognition to identify/determine whether a button click may trigger a jump affecting the page path/flow.

Workflow 400 can provide the video/page data generated by page detection module 402, element extractor 404, page path extractor 412, and/or the like, to allow for converting the video content to one or more output pages, such as HTML pages 414. For example, Workflow 400 can provide for output pages (e.g., HTML pages 414, etc.) to be generated, based on the video content, using data associated with the detected pages, extracted elements, element styles, element types, page path/flow, and/or the like.

Figure 5A:
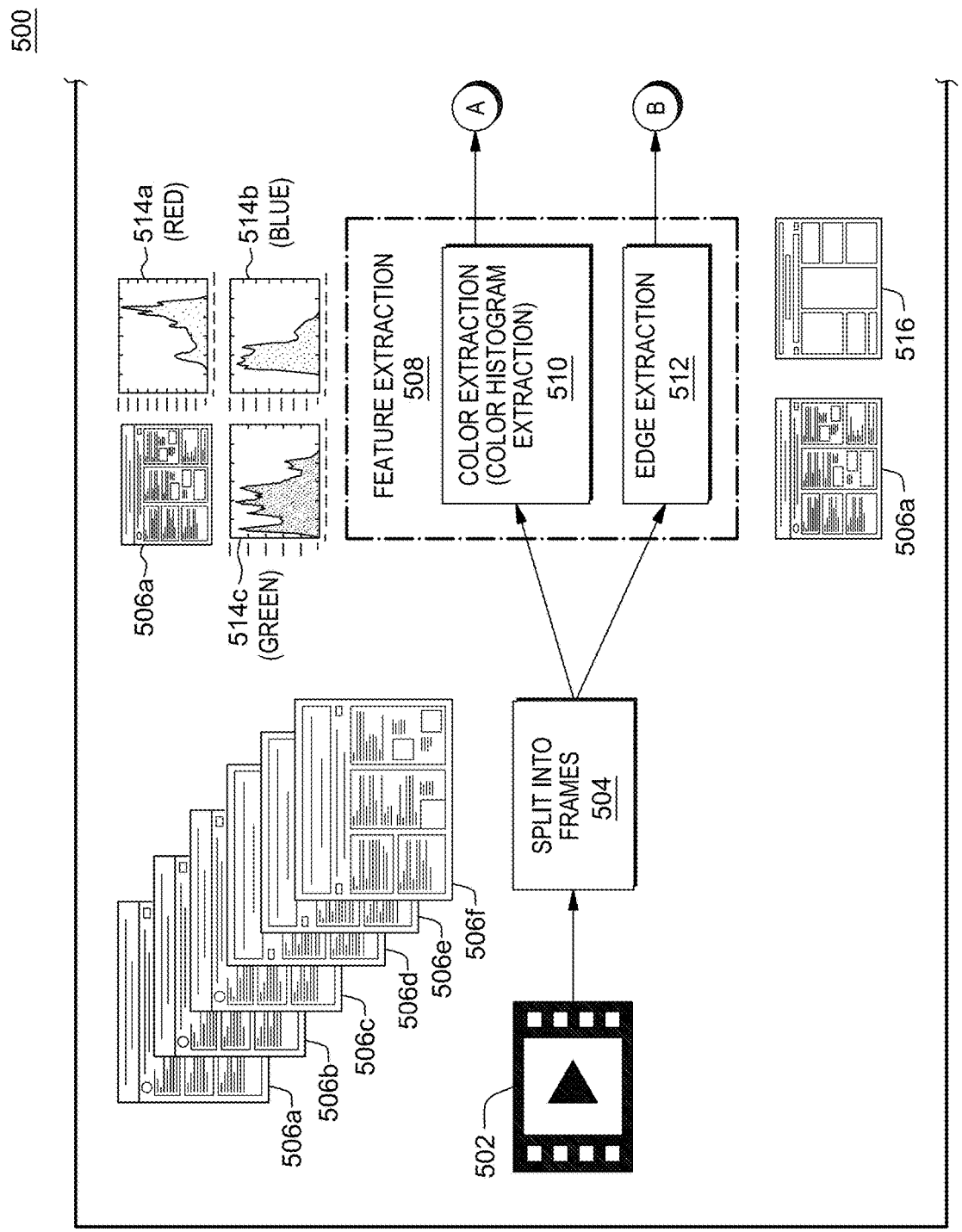
FIGS. 5A-B depict a block diagram of an example page detection workflow, according to embodiments of the present invention.
Figure 5B:
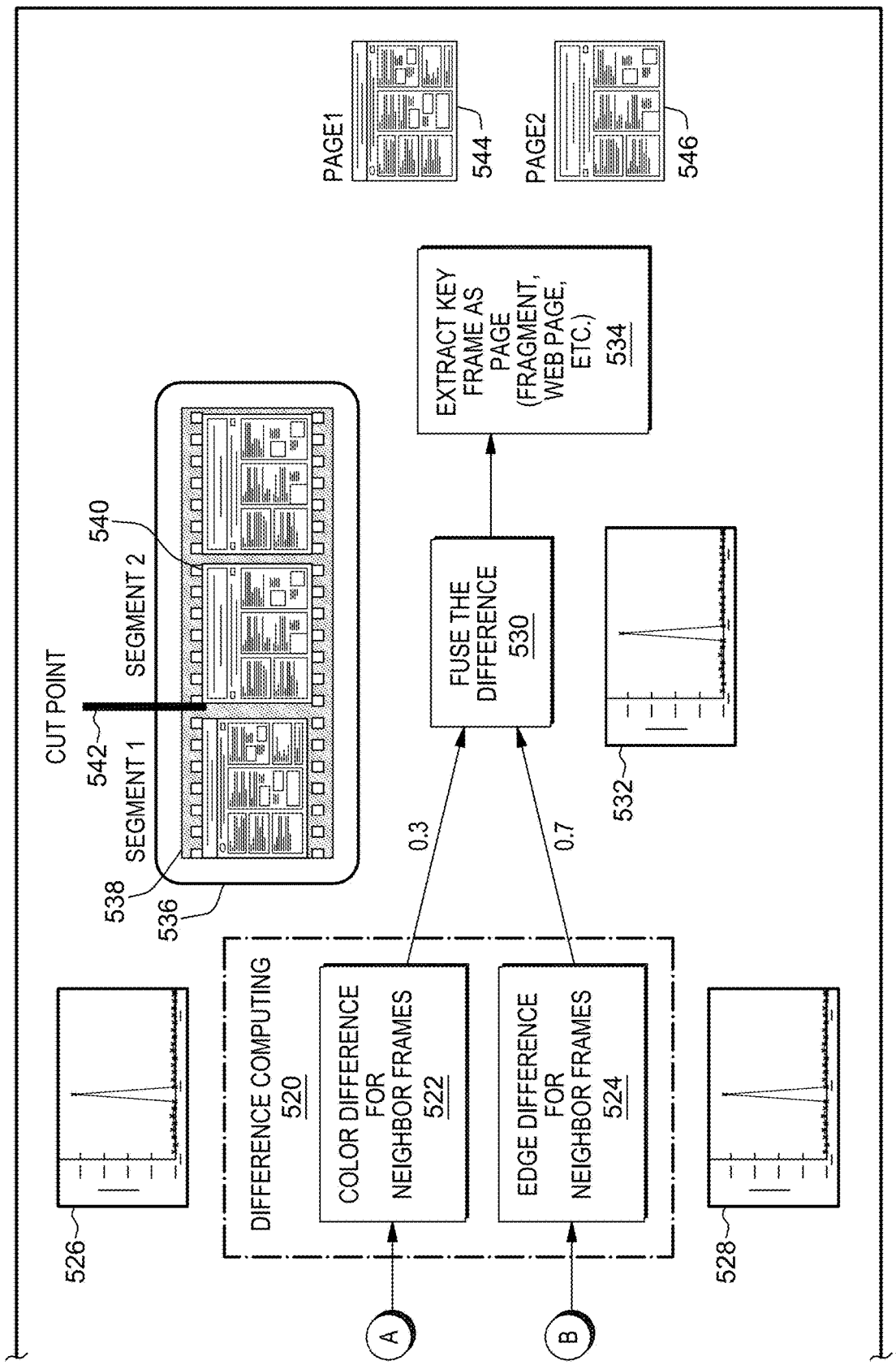

FIG. 5 depicts a block diagram of an example page detection workflow 500, according to embodiments of the present invention. As illustrated in FIG. 5, in some embodiments, a computing system (e.g., server computer 200 of FIG. 1 or the like) can provide for detection of pages in video content, for example, using a page detection workflow 500 or the like, as part of operations for generating pages (e.g., HTML pages, etc.) based on video content. In some embodiments, page detection workflow 500 can include modules/operations such as feature (e.g., element, etc.) extraction 508, difference computing 520, frame segmentation such as depicted by segmented frames 536, key frame extraction 534, page/video fragment output such as depicted by page output 544 and page output 546, and/or the like.

Generally, for example, different application screens/pages, web pages, content screens/pages and the like (e.g., video content) can include different frameworks and/or different colors. As such, edge information (e.g., framework edges, etc.) and color information in such video content can provide clues to distinguish different pages in the video content. In some embodiments, such as illustrated in FIG. 5, edge information and color information can be obtained from the video, for example, associated with frames of the video. The edge information and color information associated with the video frames can be used to determine edge differences and color differences, for example, between neighboring video frames. The edge difference and color difference of neighbor frames can be analyzed to provide for detecting and/or determining different pages within the video. Content (e.g., elements, features, components, etc.) and associated data can be extracted/determined from the different pages and used in generating pages, for example, HTML pages, other markup language pages, and/or the like, that can be subsequently provided, rendered, and/or viewed.

As illustrated, in some embodiments, video 502 (e.g., video content, video data, video stream, websites, images, etc.) can be provided to page detection workflow 500. As an example, in some embodiments, a user, developer, and/or the like may determine that video content (e.g., video, website, presentation, poster, etc.) being viewed/presented can be converted to a set of pages, for example HTML pages or other markup language pages, that can be subsequently rendered for viewing (e.g., stored/viewed at a local/remote computing device, provided/uploaded for a website, viewed/presented by a web browser, etc.). Page detection workflow 500 can obtain the video 502 and provide for splitting the video into fragments/pages (e.g., page detection) that can be used in generating HTML pages (or the like), for example, to allow for recording, storing, rendering, and/or viewing content that is based on and/or extracted from originally viewed video.

The video 502 can be provided to frame module 504. Frame module 504 can split the video 502 split into a plurality of frames (e.g., video frames) such as frames 506a-506f, for example, to facilitate page detection. In some embodiments, machine-learning systems, computer vision applications/systems, and/or the like can be used for splitting the video into frames. As an example, in some embodiments, Open Source Computer Vision Library (OpenCV) and/or the like can be used to split the video into frames, for example, by frame module 504.

The video frames, such as frames 506a-506f, can be provided from frame module 504 to feature extraction 508. Feature extraction 508 can provide for extracting data associated with each video frame (e.g., frames 506a-506f, etc.) and can include color extraction 510 and edge extraction 512. For example, color extraction 510 can obtain the video frames (e.g., frames 506a-506f, etc.) and extract (e.g., determine, identify, etc.) color information for each frame. As an example, in some embodiments, color extraction 510 can generate one or more color histograms, such as frame 506a color histograms 514a-514c, for each frame and extract color information for each frame based on the color histogram(s). Additionally, edge extraction 512 can obtain the video frames (e.g., frames 506a-506f, etc.) and extract (e.g., determine, identify, etc.) edge information for each frame, such as edges 516 of frame 506a. As an example, in some embodiments, edge extraction 512 can extract edge information (e.g., edges 516, etc.) for each frame based on Canny edge detection and/or the like.

The color information and edge information for each frame can be provided (e.g., from feature extraction 508, etc.) to difference computing 520. Difference computing 520 can provide for computing color information (e.g., color histogram) differences and edge differences for neighbor frames and can include color difference module 522 and edge difference module 524. For example, color difference module 522 can obtain the color information for each frame from color extraction 510. Color difference module 522 can obtain color information associated with neighbor frames and compute a color difference, for example, color difference 526, between each pair of neighbor frames based on each frames color information. Edge difference module 524 can obtain the edge information for each frame from edge extraction 512. Edge difference module 524 can identify edge information associated with neighbor frames and compute an edge difference, for example, edge difference 528, between each pair of neighbor frames based on each frames color information.

The color difference and the edge difference for neighbor frames can be provided to fuser 530. Fuser 530 can fuse the color difference and the edge difference for neighbor frames (e.g., for each pair of neighbor frames, etc.) to generate a fused difference for neighbor frames, for example, fused difference 532. As an example, in one frame, the computing system can sniff how many sections (M) the frame has and the average color for each section (e.g., because each pixel has its own RGB, the average value can be calculated for one section to provide the average R, G, and B). This can provide one array S[M][3] for each frame. The difference between the neighbor frames could then be determined using the array for each frame, for example, $S_1[M_1][3]-S_2[M_2][3]$.

In some embodiments, fuser 530 can compare the fused difference for neighbor frames (e.g., each pair of neighbor frames, etc.) to a specified threshold, for example, to separate or group the frames into segments. As an example, a threshold $T[\Delta M, \Delta R, \Delta G, \Delta B]$ can include the section and color difference between neighbor frames. The threshold may be defined, for example, as:

$\Delta M$—the ratio of the different sections, such as 10% (contains more than 1 sections), 20% (contains more than 5 sections, but less than 10), ignore (contains less than 5 sections);

$\Delta R$—10% for one section (25 in RGB value);
$\Delta G$—10% for one section (25 in RGB value);
$\Delta B$—10% for one section (25 in RGB value);
using the edge info to decide the similar segments.

As illustrated, segmented frames 536 have been separated at cut point 542 to group frames into segment 538 (e.g., including one frame) and segment 540 (e.g., including multiple frames). In some embodiments, each segment can include one or more frames of video (e.g., neighbor frames, etc.) whose fused differences are below a specified difference threshold value, for example. The frames in each segment (e.g., for segments including more than one frame) can be considered as representative of a same page.

The segmented frame data, for example, segment 538 and segment 540, can be provided to key frame extraction 534. Key frame extraction 534 can extract a key frame from each segment as a representative page (e.g., video fragment, etc.) for the segment. For example, in some embodiments, a frame in or near the middle of a segment that includes multiple frames, such as segment 540, can be extracted (e.g., selected, obtained, etc.) as the key frame for that segment. Further, for a segment having a single frame, the single frame of the segment would be extracted as the key frame. The key frames can be provided as the detected pages (e.g., video fragments, etc.) for the video, for example page 544 and page 546, and these detected pages (e.g., video fragments, etc.) can be provided for generation of HTML pages and/or other markup language pages based on the video content. As an example, in some embodiments, pages (e.g., video fragments, etc.) detected in the video by page detection workflow 500 (e.g., output page 544 and page 546, etc.) can be provided for extraction and/or generation of element data for each page (e.g., video fragment, etc.), for example, by element extractor 404 of FIG. 4, element breakdown workflow 600 of FIG. 6, element type recognition workflow 700 of FIG. 7, element style generator 800, page path recognition 900 of FIG. 9, and/or the like.

Figure 6:
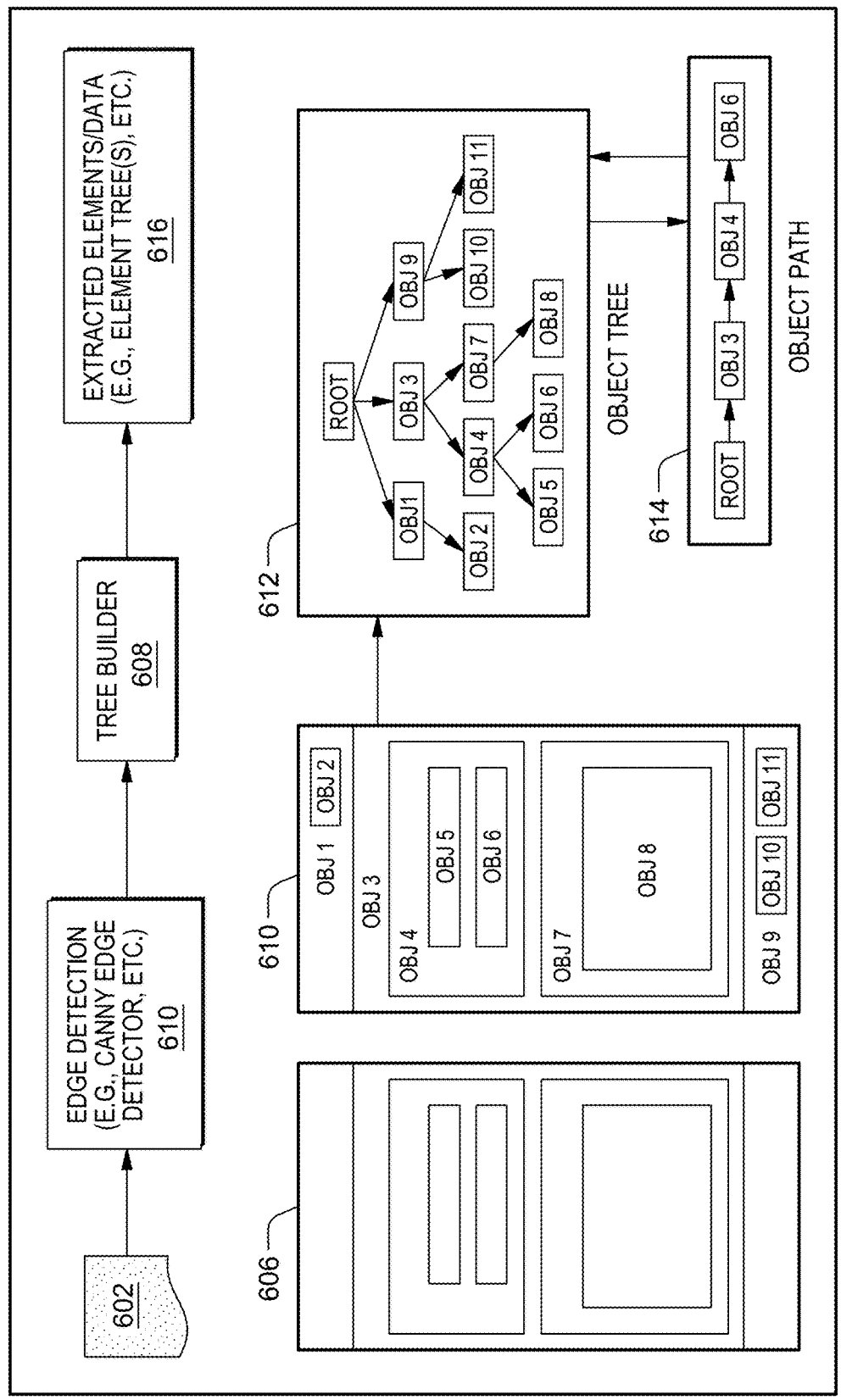
FIG. 6 depicts a block diagram of an example element breakdown workflow, according to embodiments of the present invention.

FIG. 6 depicts a block diagram of an example element breakdown workflow 600, according to embodiments of the present invention. As illustrated in FIG. 6, in some embodiments, a computing system (e.g., server computer 200 of FIG. 1 or the like) can provide for extracting elements from one or more detected pages (e.g., video fragments, etc.) of the video content. In some embodiments, element breakdown workflow 600 can obtain detected pages (e.g., video fragments, etc.) generated by page detection workflow 500, for example. Element breakdown workflow 600 can provide for extracting elements (e.g., features, components, objects, etc.) from the detected pages and providing the extracted elements and/or data associated with extracted elements for use in generating HTML pages and/or other markup language pages based on video content.

As illustrated in FIG. 6, in some embodiments, element breakdown workflow 600 can include input data 602 (e.g., video fragments, detected pages, images, etc.), edge detection module 604, tree builder 608, data output 616, and/or the like. In some embodiments, detected pages (e.g., video fragments, etc.) can be obtained by element breakdown workflow 600 as input data, such as input data 602, for example, from page detection module 402, page detection workflow 500, and/or the like. Input data 602 (e.g., video fragments, detected pages, images, etc.) can be provided to edge detection module 610. Edge detection module 610 can provide for using edge detection to recognize elements (e.g., components, features, objects, etc.) include in and/or associated with a detected page (e.g., video fragment, etc.) that can be used in generating HTML pages. For example, edge detection module 610 can detect multiple edges included on a page, such as detected page edge structure 606 (e.g., edge graph, etc.), and identify (e.g., determine, extract, etc.) one or more elements on a page, such as in page element structure identified by edge detection module 610, based, at least in part, on the detected edges (e.g. detected edge structure 606, edge graph, etc.) associated with each page (e.g., video fragment, etc.). In some embodiments, edge detection module 610 can perform edge detection based on a Canny edge detection algorithm and/or the like (e.g., Canny edge detector, etc.).

In some embodiments, the identified elements and/or data associated with the identified elements (e.g., page element structure identified by edge detection module 610, etc.) can be provided to a tree builder 608. The tree builder 608 can generate/build a tree based on the relationships between the page elements, for example, object tree 612. A tree, such as object tree 612, can be abstracted from a page structure (e.g., identified/extracted elements, etc.), such as page element structure identified by edge detection module 610. As an example, tree builder 608 can establish the entire page (e.g., video fragment, etc.) as the root of the tree. Tree builder 608 can add nodes to the tree based on the page element relationships, for example, in a top-to-bottom and left-to-right progression, to generate the tree (e.g., object tree 612, etc.) abstracted from the page structure (e.g., page element structure identified by edge detection module 610).

A resulting object tree (e.g., object tree 612, etc.) can provide for a path locating an element in a page. For example, a path from the root to a specified tree node, such as object path 614, can provide a unique prerequisite to locating the element associated with the specified node at a subsequent time. As an example, to locate an element associated with a node "Obj 6" of a page associated with page element structure identified by edge detection module 610, object path 614 provides for traversing object tree 612 from the root node, to the node "Obj 3", then to the node "Obj 4", and then arriving at the node "Obj 6" associated with the specified element. The object tree can be generated in the same manner, for example, on another device, platform, or the like, such that the path is consistent and can provide for locating the exact object on a new screen.

In some embodiments, element breakdown workflow 600 can provide the extracted element, data associated with the extracted elements, and/or the like, for example, data output 616, etc., for use in generating HTML pages based on the video content.

Figure 7A:
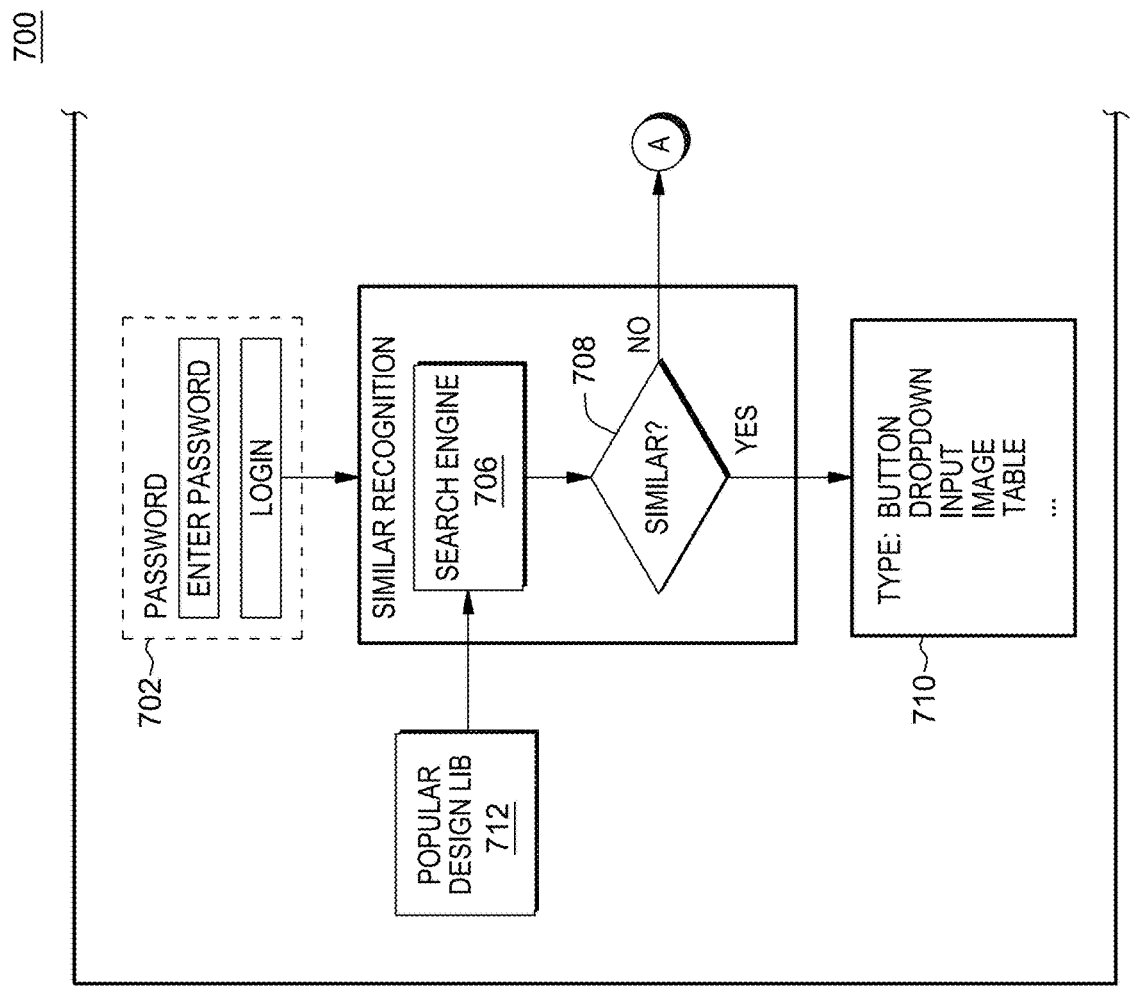
FIGS. 7A-B depict a block diagram of an example element type recognition workflow, according to embodiments of the present invention.
Figure 7B:
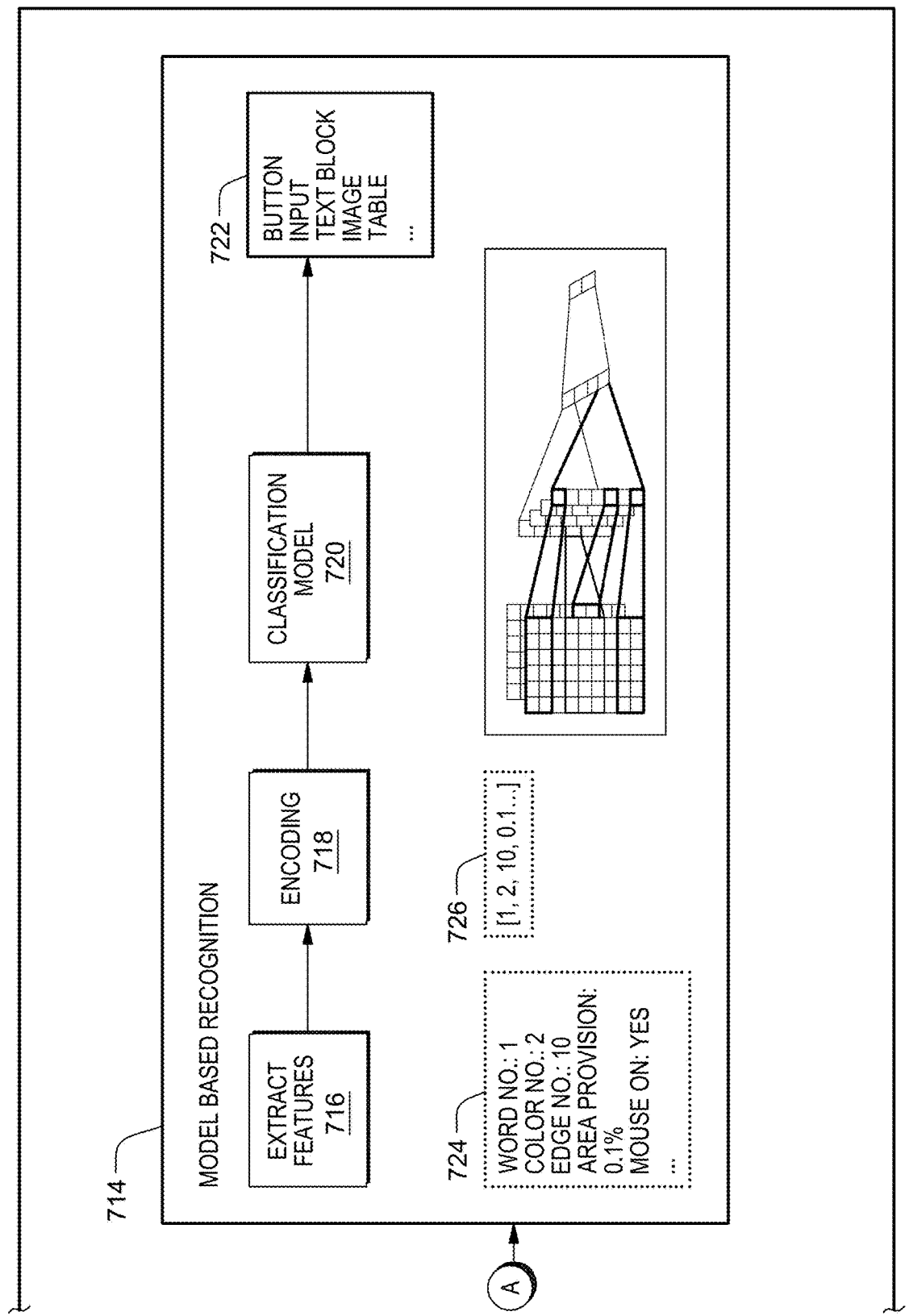

FIG. 7 depicts a block diagram of an example element type recognition workflow 700, according to embodiments of the present invention. As illustrated in FIG. 7, in some embodiments, a computing system (e.g., server computer 200 of FIG. 1 or the like) can provide for recognizing and/or determining element types (e.g., element type data, etc.) associated with extracted elements from the video content. In some embodiments, an element type recognition workflow 700 can obtain extracted elements and/or data associated with extracted elements for example, from element breakdown workflow 600. Element breakdown workflow 600 can provide for recognizing and/or determining element types associated with and/or descriptive of extracted elements and providing element type data for use in generating HTML pages and/or other markup language pages based on video content. In some embodiments, element types can include button, dropdown, input, image, text block, table, and/or the like.

As illustrated in FIG. 7, in some embodiments, element type recognition workflow 700 can include a similarity recognition module 704, a model-based recognition module 714, and/or the like. In some embodiments, extracted elements and/or data associated with extracted elements can be obtained by element type recognition workflow 700, such as element input 702, for example, from element breakdown module 406, element breakdown workflow 600, and/or the like. Element input 702 can be provided to a similarity recognition module 704. In some embodiments, a similarity recognition module 704 can provide for searching a corpus of elements, for example, a popular design element library, to compare extracted elements to elements included in the corpus to determine element types for the extracted elements.

For example, data associated with and/or indicative of an extracted element, such as element input 702, can be provided to a search engine 706 and/or the like included in and/or associated with similarity recognition module 704. Search engine 706 can access a corpus of elements, such as design element library 712, and search element data in design element library 712 to compare to element input 702. A decision module 708 can determine if an element like element input 702 can be found in design element library 712. If a similar element is identified, element type data (e.g., button, dropdown, input, image, text block, table, etc.) from the similar element in the design element library 712 can be associated with element input 702, for example, as element type data 710. For example, an element type, such as button, dropdown, input, image, text block, table, and/or the like, can be assigned to or associated with the extracted element (e.g., element input 702). Assigned and/or associated element type data, such as element type data 710, for an extracted element (e.g., element input 702, etc.) can be provided as output of element type recognition workflow 700 and used in generating HTML pages.

Alternatively, if decision module 708 determines that a similar element is not identified in the popular design element library 712, one or more trained machine learning model(s), for example, classification model(s), can be provided and/or accessed to assist in determining an element type for an extracted element (e.g., element input 702, etc.). For example, in response to a negative similar element determination by decision module 708, element input 702 can be provided to a model-based recognition module 714. A model-based recognition module 714 can include feature extraction module 716, encoding module 718, trained model 720, and/or the like.

The element input 702 can be provided to feature extraction module 716. A feature extraction module 716 can provide for identifying and/or extracting features, such as features 724 or the like, associated with an extracted element (e.g., element input 702, etc.). In some embodiments, identified/extracted can include data regarding an action and page response associated with an element, for example a user selection and subsequent jump, to assist in determining an element type.

The element feature data (e.g., features 724, etc.) can be provided to encoding module 718. Encoding module 718 can provide for encoding the features such that the feature data can be input to a trained model. In some embodiments, for example, encoding module 718 can provide for transforming categorical values in feature data (e.g., features 724, etc.) into numerical values, such as encoded data 726 and/or the like, which can be provided as input to a machine learning model.

The encoded data 726 can be provided as input to a trained model 720, for example a classification model. A trained model 720 can provide for determining an element type for an extracted element (e.g., element input 702 data, etc.) based on features (e.g., features 724 encoded as encoded data 726, etc.) associated with and/or descriptive of the extracted element (e.g., element input 702, etc.). The trained model 720 can determine an element type representative of an extracted element (e.g., element input 702, etc.) associated with the model input (encoded data 726, etc.) and provide the element type determination as output, such as model-based element type data 722, to be assigned to and/or associated with an extracted element (e.g., element input 702, etc.). For example, an element type, such as button, dropdown, input, image, text block, table, and/or the like, can be assigned to and/or associated with the extracted element, for example, as model-based element type data 722. The assigned/associated element type data, for example, model-based element type data 722, for extracted elements can be provided as output of element type recognition workflow 700 and used in generating HTML pages.

Figure 8:
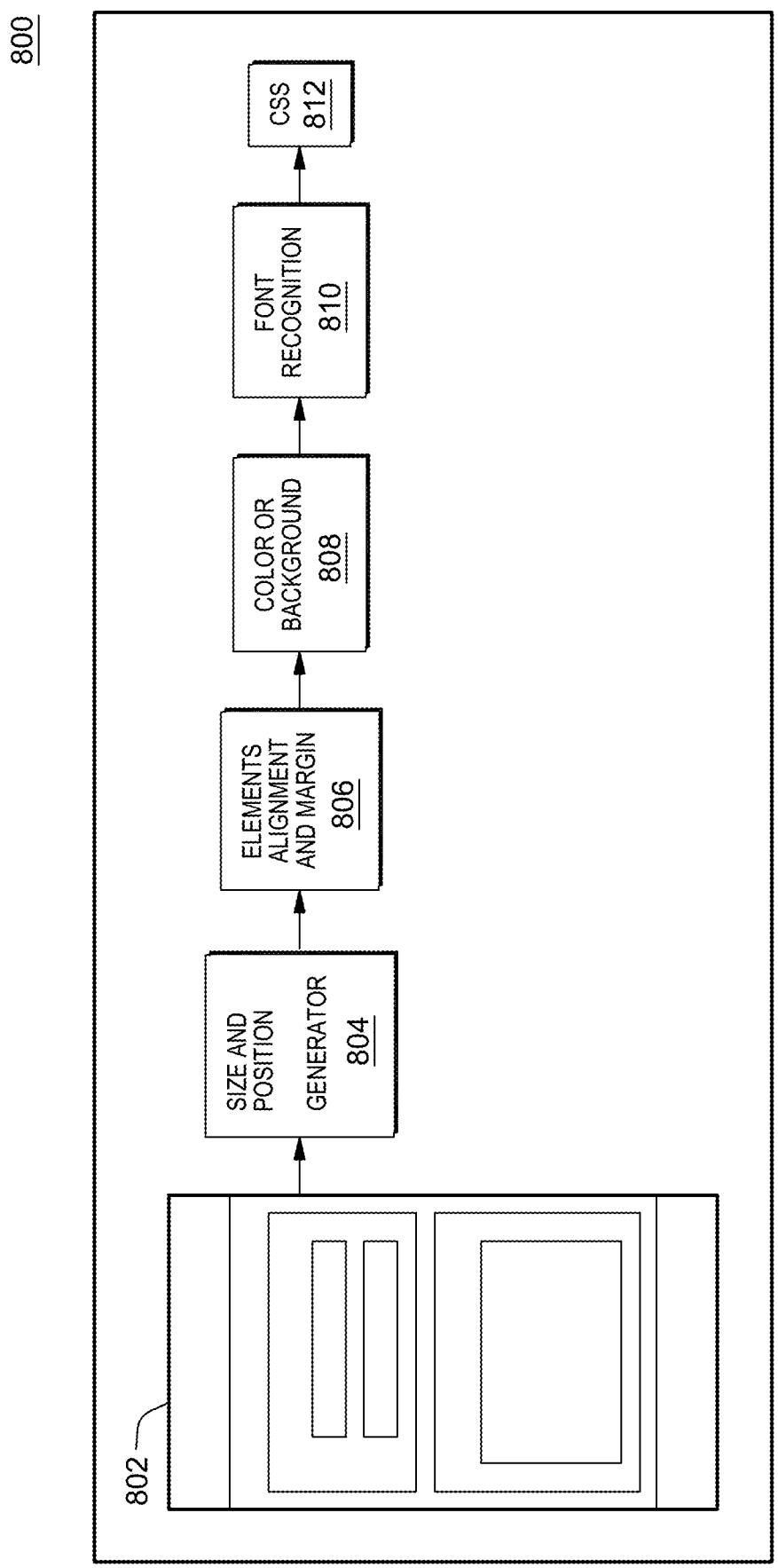
FIG. 8 depicts a block diagram of an example of an example element style generator, according to embodiments of the present invention.

FIG. 8 depicts a block diagram of an example of an example element style generator 800, according to embodiments of the present invention. As illustrated in FIG. 8, in some embodiments, a computing system (e.g., server computer 200 of FIG. 1 or the like) can provide for determining and/or generating style data that can assist in the rendering of page elements. In some embodiments, an element style generator 800 can obtain extracted elements and/or data associated with extracted elements, for example, from element breakdown workflow 600, element type recognition workflow 700, and/or the like. An element style generator 800 can provide for generating and/or determining style data associated with and/or descriptive of extracted elements and/or detected pages. An element style generator 800 can provide the generated page and/or element style data to assist in generating HTML pages, and/or other markup language pages, based on video content. In some embodiments, element style data can include one or more of size data, position data, alignment data, color background data, font data, and/or the like that may be associated with and/or descriptive of extracted elements. In some embodiments, an element style generator 800 can provide for generating cascading style sheets (CSS) to describe element and page style data, such as layout, colors, fonts, and/or the like, for an HTML page and/or other markup language page. CSS can be used for describing the presentation (e.g., formatting, etc.) of markup language documents, such as an HTML documents (e.g., HTML pages, etc.), for example, and can allow for separation of the presentation (e.g., format, etc.) of a document from the content of a document.

As illustrated in FIG. 8, in some embodiments, an element style generator 800 can include a size and position generator 804, an elements alignment generator 806, a color and/or background generator 808, a font recognition module 810, and/or the like. In some embodiments, extracted elements and/or data associated with extracted elements can be obtained by element style generator 800 to assist in generation of page and/or element style data. For example, in some embodiments, element style generator 800 can obtain an edge graph, such as edge graph 802, associated with a detected page (e.g., video fragment, etc.) as input to assist in generating element style data. In some embodiments, element style generator 800 can additionally obtain color histogram data, element type data, and/or the like associated with and/or descriptive of extracted elements as input to assist in generating element style data.

The size and position generator 804 can obtain edge graph 802 to use in determining the size and position of extracted elements for the detected page associated with edge graph 802. For example, size and position generator 804 can scan the different blocks identified in edge graph 802 and calculate an equivalent page position and element size for each extracted element represented in edge graph 802. In some embodiments, size and position generator 804 can provide size data and position data as style data output that can, for example, be used in the generation of CSS for the elements/page, such as CSS 812.

The elements alignment generator 806 can obtain edge graph 802 to use in determining element alignments for extracted elements in the detected page associated with edge graph 802. For example, elements alignment generator 806 can identify a parent box for an element and determine an alignment for the element, for example, based on some predefined rules, parameters, and/or the like. In some embodiments, elements alignment generator 806 can provide element alignment data as style data output that can, for example, be used in the generation of CSS for the elements/page, such as CSS 812.

The color and/or background generator 808 can obtain color histogram data and element type data for extracted elements to use in determining color and/or background for extracted elements in a detected page. In some embodiments, color and/or background generator 808 can combine color histogram data, element type data, and/or the like to define and/or identify a color/background type, for example, pure color background, image background, gradient color background, and/or the like. For example, in some embodiments, color and/or background generator 808 can provide the color/background type data as style data output that can be used in the generation of CSS for the elements and/or page, such as CSS 812. In some embodiments, color and/or background generator 808 can determine there is a pure color background and provide the color value data as style output data that can, for example, be used in the generation of CSS for the elements/page. In some embodiments, color and/or background generator 808 can determine there is an image background and provide a snapshot of at least some portion of the image as background output data that can, for example, be used in the generation of CSS for the elements/page.

In some embodiments, font recognition module 810 can obtain extracted elements, data associated with extracted elements, and/or the like and provide for identifying and/or recognizing font data associated with the extracted elements. For example, font recognition module 810 can identify the font(s) associated with extracted elements and generate font data that can be provided as style output data that can be used in the generation of CSS for the elements/page, such as CSS 812. In some embodiments, font recognition module 810 can include and/or access trained machine learning model(s), for example open convolutional neural network (CNN) model(s) and/or the like, that can provide for determining and/or generating font recognition data.

Element style generator 800 can provide for generating CSS and/or the like for the extracted elements and/or detected pages based on one or more of the size data and position data, the element alignment data, the color/background data, the font recognition data, and/or the like. Element style generator 800 can provide the CSS and/or the like representative of the element style data to assist in generating HTML pages and/or other markup language pages based on video content.

Figure 9A:
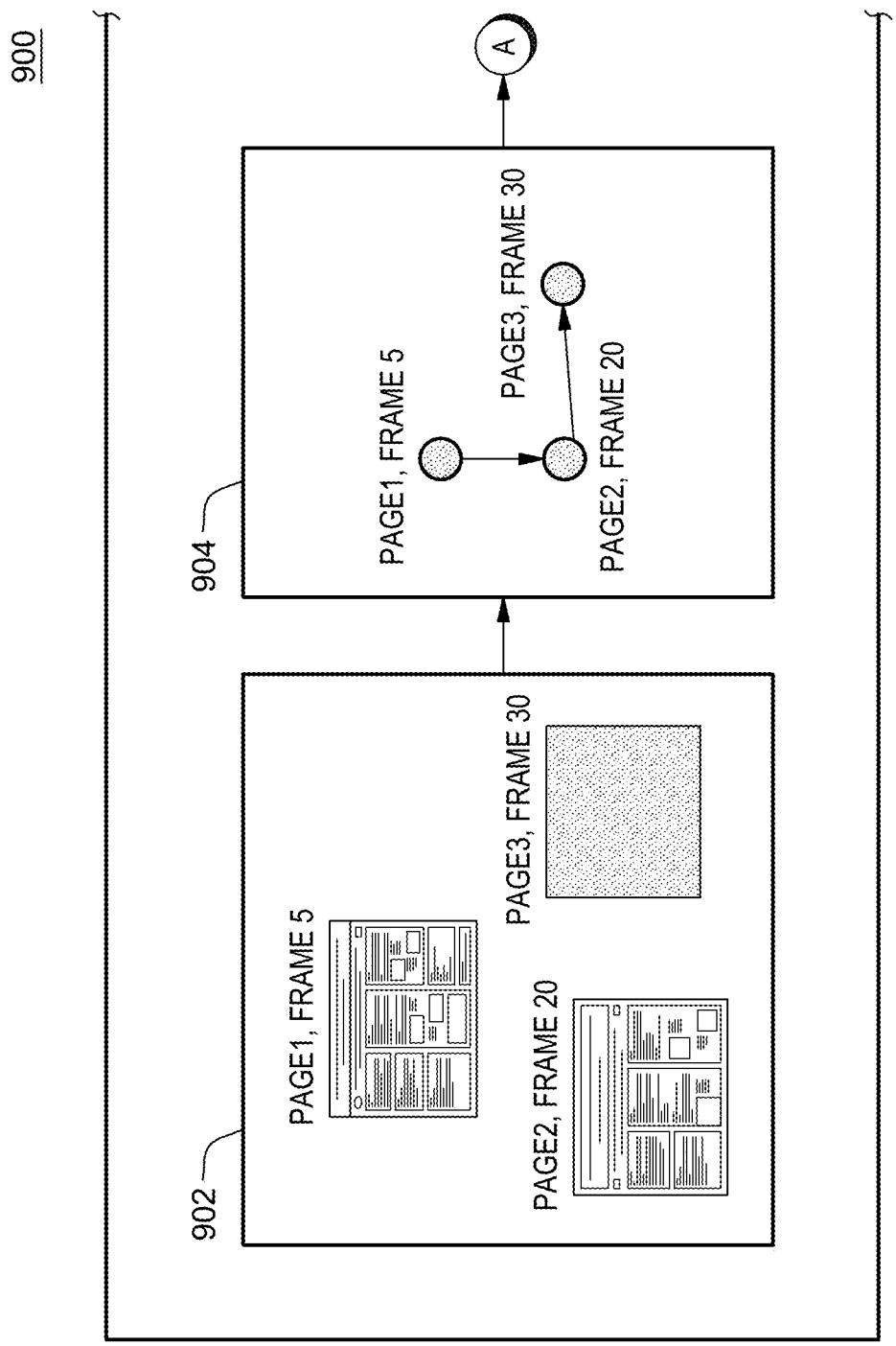
FIGS. 9A-B depict a block diagram of example page path recognition, according to embodiments of the present invention.
Figure 9B:
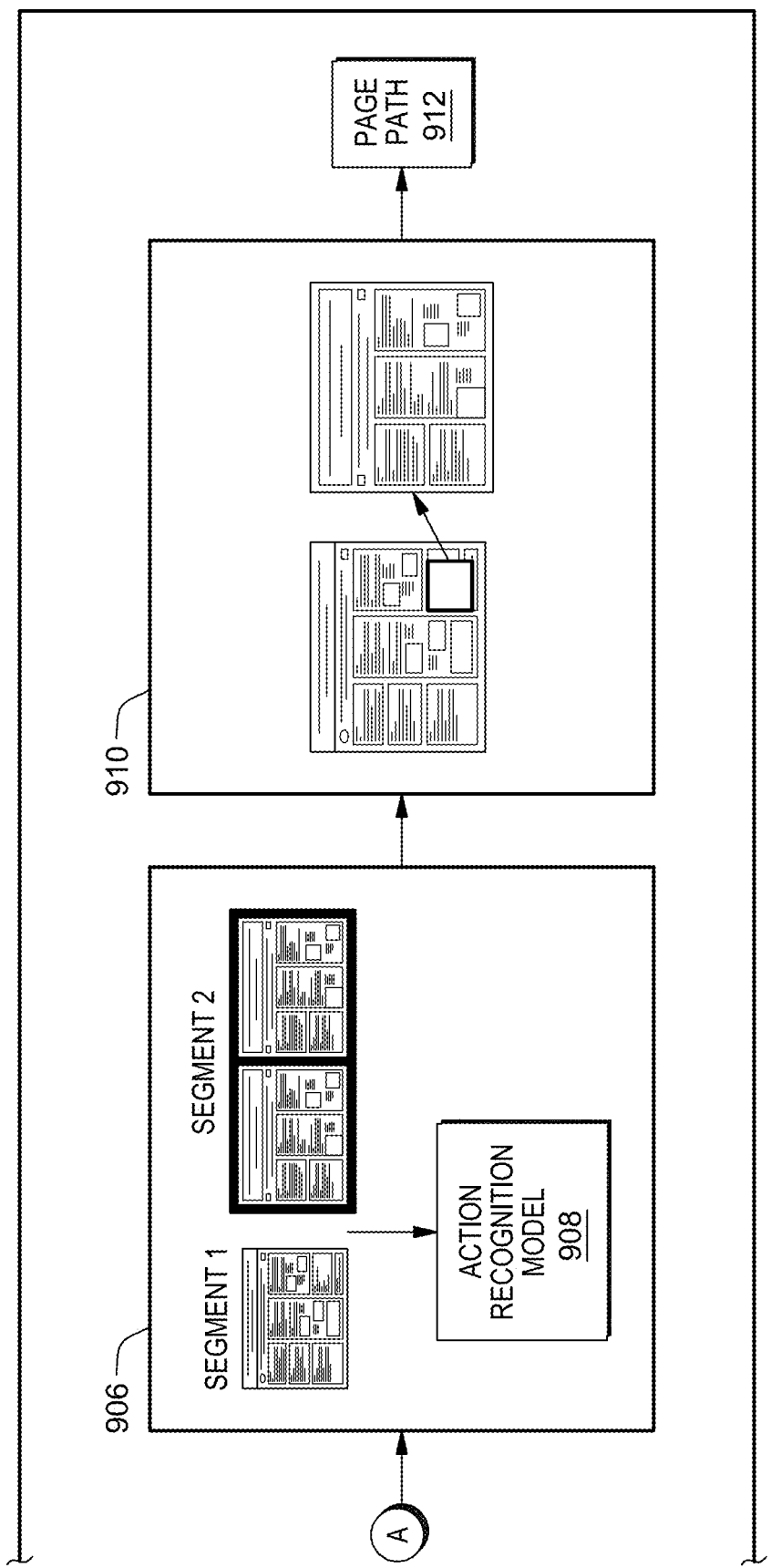

FIG. 9 depicts a block diagram of example page path recognition 900 (e.g., page path extractor, etc.), according to embodiments of the present invention. As illustrated in FIG. 9, in some embodiments, a computing system (e.g., server computer 200 of FIG. 1 or the like) can provide for identifying and/or determining a page path (e.g., page flow, etc.) associated with a plurality of detected pages and/or extracted elements. As illustrated in FIG. 9, in some embodiments, page path recognition 900 (e.g., page path extractor, etc.) can include page input 902, page path extractor 904, action recognition module 906, action path module 910, page path output 912, and/or the like.

In some embodiments, page path recognition 900 can obtain detected pages, data associated with detected pages, and/or the like, for example, from page detection workflow 500, element breakdown workflow 600, and/or the like for use in determining a page path (e.g., page flow, etc.). As an example, in some embodiments, page path recognition 900 can obtain detected pages and segmented page frame numbers (e.g., video frame numbers, etc.) associated with the detected pages (e.g., video fragments, etc.), such as page input 902, to use in determining a page path (e.g., page flow, etc.). In some embodiments, a default page path (e.g., default page flow, etc.) can be determined based, at least in part, on a segmented page frame number (e.g., video frame number, etc.) associated with each detected page (e.g., video fragment, etc.), such as determined, for example, in page detection workflow 500 (e.g., segmented frames 536, etc.). For example, as illustrated in FIG. 9, page input 902 can include data associated with page 1/segmented frame number 5, page 2/segmented frame number 20, page 3/segmented frame number 30, and/or the like.

Page input 902 (e.g., detected pages and segmented page frame numbers, etc.) can be provided to a page path extractor 904. Page path extractor 904 can generate data representative of a directed path (e.g., flow, etc.) for the detected pages, for example, based on a segmented frame number (e.g., video frame number, etc.) associated with each detected page (e.g., video fragment, etc.).

In some embodiments, an action recognition module 906 can provide for recognizing and/or determining an action and/or response associated with one or more pages and/or one or more elements, for example, to refine and/or modify an extracted page path (e.g., default page path) based on a navigation associated with the action/response. As an example, action recognition module 906 can provide for recognition of an action associated with a page, such as an element selection (e.g., button click, etc.) and/or the like, which may result in a page navigation, such as a jump to another page and/or the like. In some cases, an action may result in a jump to a page that is not necessarily the next page (e.g., in relation to the page associated with the action, etc.) in a path sequence, for example, based on frame numbers (e.g., default page path, etc.). As such, the recognized action may result in a need to refine and/or adjust a default page path (e.g., page path generated based on frame numbers, etc.).

In some embodiments, an action recognition module 906 can include one or more models (e.g., machine learning model(s), etc.) to assist in action and/or response recognition, such as action recognition model 908. The action recognition module 906 may obtain detected pages, data associated with detected pages, and/or the like to be provided to action recognition model 908 to determine if an action associated with a page/element may affect the page path. As an example, action recognition module 906 may obtain segment data associated with the detected pages (e.g., generated by page detection workflow 500, etc.) and provide the segment data to action recognition module 906 to recognize and/or determine action(s) that affect a page path.

An action path module 910 can provide for generating page path data associated with recognized action(s) from action recognition module 906. For example, action path module 910 can determine and/or generate a path associated with an action and provide for generating and/or refining a page path based, at least in part, on the action path. For example, action path module 910 can identify a jump to a different page as a result of a recognized action and refine or modify a prior generated page path (e.g., default page path, etc.), for example, generated based on segmented frame numbers and/or the like.

In some embodiments, page path recognition 900 can provide page path data, such as page path output 912 and/or the like, for use in in the generation of HTML pages and/or other markup language pages based on video content.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   obtaining video data;
   dividing the video data into a plurality of video fragments based, at least in part, on page detection, the page detection comprising:
      splitting the video data into frames;
      extracting color information for each frame;
      extracting edge information for each frame;
      computing a color difference for each pair of neighbor frames, based on the color information for each frame;
      computing an edge difference for each pair of neighbor frames, based on the edge information for each frame; and
      segmenting the frames into different pages based on fusing the color difference and the edge difference for each pair of neighbor frames and comparing the fused difference to a difference threshold;
      determining a key frame for each segment of frames; and
      providing the key frame for each segment of frames as a video fragment;
   extracting one or more elements from each of the plurality of video fragments;
   determining element type data for each of the one or more extracted elements;
   generating element style data for the one or more extracted elements;
   determining page flow for the plurality of video fragments, wherein the page flow indicates a presentation order for the plurality of video fragments; and
   generating one or more pages based, at least in part, on the one or more elements extracted from the plurality of video fragments, the element type data, the element style data, and the page flow.

2. The computer-implemented method of claim 1, wherein the one or more pages generated comprise Hypertext Markup Language pages.

3. The computer-implemented method of claim 1, wherein the video data is divided into the plurality of video fragments such that each of the plurality of video fragments includes a single page.

4. The computer-implemented method of claim 1, wherein the extracting the one or more elements from the plurality of video fragments comprises:
    detecting element edges associated with each of the plurality of video fragments;
    generating an edge graph for each of the plurality of video fragments based on the element edges detected in each of the plurality of video fragments; and
    determining the one or more extracted elements from each of the plurality of video fragments based on the edge graph for each of the plurality of video fragments.

5. The computer-implemented method of claim 4, further comprising:
    generating an object tree for each of the plurality of video fragments based on the one or more extracted elements; and
    providing the object tree for each of the plurality of video fragments to locate the one or more extracted elements within each video fragment.

6. The computer-implemented method of claim 1, wherein the determining the element type for each of the one or more extracted elements comprises:
    searching a design element library to determine whether a similar element relative to each of the one or more extracted elements can be obtained;
    in response to obtaining a search result including a similar element relative to an extracted element, providing a type associated with the similar element as an element type for the extracted element; and
    in response to not obtaining a search result for the extracted element, determining the element type for the extracted element using one or more machine-learning models.

7. The computer-implemented method of claim 1, wherein the generating the element style data for the one or more extracted elements comprises:
    determining size data and page position data associated with each of the one or more extracted elements;
    determining alignment data associated with each of the one or more extracted elements;
    determining background data associated with each of the one or more extracted elements;
    generating cascading style sheets, wherein the cascading style sheets include the size data, the page position data, the alignment data, and the background data for the one or more extracted elements associated with each video fragment; and
    providing the cascading style sheets representative of the element style data for the one or more extracted elements.

8. The computer-implemented method of claim 1, wherein the determining the page flow for the one or more pages represented by the plurality of video fragments comprises:
    obtaining a segmented frame number associated with each of the plurality of video fragments; and
    generating the page flow for the plurality of video fragments, based, at least in part, on the segmented frame number associated with each of the plurality of video fragments.

9. The computer-implemented method of claim 8, further comprising:
    determining an action associated with a video fragment affecting the page flow; and
    modifying the page flow based on a page navigation associated with the action.

10. A computer program product comprising a computer readable storage medium having stored thereon:
    program instructions programmed to obtain video data;
    program instructions programmed to divide the video data into a plurality of video fragments based, at least in part, on page detection, the page detection comprising:
        program instructions programmed to split the video data into frames;
        program instructions programmed to extract color information for each frame;
        program instructions programmed to extract edge information for each frame;
        program instructions programmed to compute a color difference for each pair of neighbor frames, based on the color information for each frame;
        program instructions programmed to compute an edge difference for each pair of neighbor frames, based on the edge information for each frame;
        program instructions programmed to segment the frames into different pages based on fusing the color difference and the edge difference for each pair of neighbor frames and comparing the fused difference to a difference threshold;
        program instructions programmed to determine a key frame for each segment of frames; and
        program instructions programmed to provide the key frame for each segment of frames as a video fragment;
    program instructions programmed to extract one or more elements from each of the plurality of video fragments;
    program instructions programmed to determine element type data for each of the one or more extracted elements;
    program instructions programmed to generate element style data for the one or more extracted elements;
    program instructions programmed to determine page flow for the plurality of video fragments, wherein the page flow indicates a presentation order for the plurality of video fragments; and
    program instructions programmed to generate one or more markup language pages based, at least in part, on the one or more elements extracted from the plurality of video fragments, the element type data, the element style data, and the page flow.

11. The computer program product of claim 10, wherein the extracting the one or more elements from the plurality of video fragments comprises:
    detecting element edges associated with each of the plurality of video fragments;
    generating an edge graph for each of the plurality of video fragments based on the element edges detected in each of the plurality of video fragments; and
    determining the one or more extracted elements from each of the plurality of video fragments based on the edge graph for each of the plurality of video fragments.

12. The computer program product of claim 10, wherein the determining the element type for each of the one or more extracted elements comprises:
    searching a design element library to determine whether a similar element relative to each of the one or more extracted elements can be obtained;

in response to obtaining a search result including a similar element relative to an extracted element, providing a type associated with the similar element as an element type for the extracted element; and in response to not obtaining a search result for the extracted element, determining the element type for the extracted element using one or more machine-learning models.

13. The computer program product of claim 10, wherein the generating the element style data for the one or more extracted elements comprises:

determining size data and page position data associated with each of the one or more extracted elements;

determining alignment data associated with each of the one or more extracted elements;

determining background data associated with each of the one or more extracted elements;

generating cascading style sheets, wherein the cascading style sheets include the size data, the page position data, the alignment data, and the background data for the one or more extracted elements associated with each video fragment; and providing the cascading style sheets representative of the element style data for the one or more extracted elements.

14. The computer program product of claim 10, wherein the determining the page flow for the one or more pages represented by the plurality of video fragments comprises:

obtaining a segmented frame number associated with each of the plurality of video fragments; and generating the page flow for the plurality of video fragments, based, at least in part, on the segmented frame number associated with each of the plurality of video fragments.

15. A computer system comprising:

a processor set; and a computer readable storage medium;

wherein:

the processor set is structured, located, connected and programmed to run program instructions stored on the computer readable storage medium; and the stored program instructions include:

program instructions programmed to obtain video data;

program instructions programmed to divide the video data into a plurality of video fragments based, at least in part, on page detection, the page detection comprising:

program instructions programmed to split the video data into frames:

program instructions programmed to extract color information for each frame;

program instructions programmed to extract edge information for each frame;

program instructions programmed to compute a color difference for each pair of neighbor frames, based on the color information for each frame:

program instructions programmed to compute an edge difference for each pair of neighbor frames, based on the edge information for each frame;

program instructions programmed to segment the frames into different pages based on fusing the color difference and the edge difference for each pair of neighbor frames and comparing the fused difference to a difference threshold;

program instructions programmed to determine a key frame for each segment of frames; and program instructions programmed to provide the key frame for each segment of frames as a video fragment;

program instructions programmed to extract one or more elements from each of the plurality of video fragments;

program instructions programmed to determine element type data for each of the one or more extracted elements;

program instructions programmed to generate element style data for the one or more extracted elements;

program instructions programmed to determine page flow for the plurality of video fragments, wherein the page flow indicates a presentation order for the plurality of video fragments; and program instructions programmed to generate one or more pages based, at least in part, on the one or more elements extracted from the plurality of video fragments, the element type data, the element style data, and the page flow.

16. The computer system of claim 15, wherein the determining the element type for each of the one or more extracted elements comprises:

searching a design element library to determine whether a similar element relative to each of the one or more extracted elements can be obtained;

in response to obtaining a search result including a similar element relative to an extracted element, providing a type associated with the similar element as an element type for the extracted element; and in response to not obtaining a search result for the extracted element, determining the element type for the extracted element using one or more machine-learning models.

17. The computer system of claim 15, wherein the generating the element style data for the one or more extracted elements comprises:

determining size data and page position data associated with each of the one or more extracted elements;

determining alignment data associated with each of the one or more extracted elements;

determining background data associated with each of the one or more extracted elements;

generating cascading style sheets, wherein the cascading style sheets include the size data, the page position data, the alignment data, and the background data for the one or more extracted elements associated with each video fragment; and providing the cascading style sheets representative of the element style data for the one or more extracted elements.

* * * * *